United States Patent [19]
Dench et al.

[11] 3,888,911
[45] June 10, 1975

[54] PROCESS FOR THE PREPARATION OF ETHYLENE POLYMER TELOMER WAXES

[75] Inventors: John E. Dench, Dover; Harry Knutson, Brookside; Manfred K. Seven, Long Valley, all of N.J.

[73] Assignee: Allied Chemical Corporation, New York, N.Y.

[22] Filed: Mar. 2, 1971

[21] Appl. No.: 120,356

[52] U.S. Cl....... 260/484 R; 260/537 N; 260/544 Y; 260/561 N; 260/593 R; 260/642; 260/677 R
[51] Int. Cl.............................................. C07c 69/66
[58] Field of Search............ 260/484 R, 677 R, 642, 260/593 R

[56] References Cited
UNITED STATES PATENTS
3,140,303    7/1964    De la Mare.................... 260/484 R FOREIGN PATENTS OR APPLICATIONS
685,896    5/1964    Canada............................. 260/642

Primary Examiner—Lorraine A. Weinberger
Assistant Examiner—Paul J. Killos
Attorney, Agent, or Firm—Michael S. Jarosz

[57] ABSTRACT

In the production of ethylene polymer and copolymer telomer waxes by vapor phase polymerization at elevated temperatures and pressures in the presence of a free radical initiator, improved production rates of more linear wax products with reduced reactor fouling can be obtained utilizing certain peroxy and azo-initiators under specific operating conditions.

19 Claims, No Drawings

PROCESS FOR THE PREPARATION OF ETHYLENE POLYMER TELOMER WAXES

This invention relates to a continuous process for preparing ethylene polymer telomer waxes. More particularly, this invention relates to the preparation of hard ethylene polymer and copolymer telomer waxes at improved rates using specific catalysts and operating conditions.

BACKGROUND OF THE INVENTION

The production of various grades of ethylene polymer and copolymer telomer waxes in the presence of free radical initiators at elevated temperatures and pressures has been commercially practiced for some years, as described in U.S. Pat. Nos. 2,504,400, 2,683,141 and 2,712,534. The production of the hardest grades of such waxes, i.e., those having penetration hardness of less than about 3.0 (ASTM test D 1321-55T in 0.1 mm) however poses special problems and has been characterized by low production rates and high reactor fouling.

Various operating parameters affect the hardness of the resultant wax product; low temperatures of polymerization are required to minimize branching of the polymer chains which decreases the crystallinity and softens the wax product. Low initiator and low telogen concentrations are required to produce the hardest grades of wax. These operating conditions have a deleterious effect on the production rate of these waxes. For example, the lower the initiator concentrations, the lower the production rate. Conversely, increasing the initiator concentrations will increase the production rate but produce a softer wax product. Increased initiator concentration also leads to increased reactor fouling. Fouling of the reactor, that is, deposition of polymer gels and high molecular weight polyethylene onto the walls of the reactor is a very serious problem in producing ethylene telomer waxes. Beside the obvious result of decreasing the volume of the reactor leading to decreased production rates and increasing "down time" of the reactor for cleaning, undue fouling also leads to decreased efficiency of reactor cooling. The consequent erratic changes in temperature which may result increase the dangers of a runaway reaction and explosion.

Another disadvantage to the formation of gels is that they have a deleterious effect on product emulsifiability by reducing emulsion clarity and producing grainy films. This demonstrates that optimum conditions for the production of hard waxes results in lowering the production rate.

SUMMARY OF THE INVENTION

It is an object of the present invention to provide an improved continuous process for producing ethylene polymer or copolymer telomer waxes at increased production rates.

It is another object to provide a process for preparing hard ethylene polymer or copolymer telomer waxes at high production rates with minimal reactor fouling.

Further objects will become apparent from the following detailed descriptions thereof.

We have found that ethylene polymer and copolymer telomer waxes particularly those having improved hardness can be prepared at improved production rates without a concomitant increase in reactor fouling by using certain free radical initiators and certain operating conditions. These initiators include t-butylperacetate, t-butylperoctoate, 1-cyano-1-(t-butylazo)-cyclohexane, 2-(t-butylazo)isobutyronitrile and 2-t-butylazo-2-phenylpropane.

DETAILED DESCRIPTION OF THE INVENTION

According to the process of the present invention, ethylene, telogen, an initiator of the invention and optionally a comonomer are continuously fed to a suitable reactor operating under pressure and elevated temperatures. The reactants are uniformly admixed in the vapor phase and the wax product continuously withdrawn as it is formed from the bottom of the reactor.

The ethylene, comonomer if employed, initiator and telogen are fed at approximately reactor pressure to the upper portion of a suitable reactor at a constant rate in order to maintain steady state conditions in the reactor once equilibrium is established. The reactants are in the vapor phase and the wax product, which is a liquid under the reaction conditions, falls to the bottom of the reactor. The product is removed as it is formed, thereby minimizing exposure of the product to the reaction conditions. The initiator is added to the telogen prior to their entry into the reactor. Any comonomer is also generally added to the telogen stream. Residence time of the reactants and product in the reactor is regulated by the rate of withdrawal of the product and the off gases, which also affects the conversion. The off gas includes unreacted starting materials, by-products of the reaction and the like, as well as catalyst and free radical residues. The latter can attack the polymer chains causing branching of the polymer and formation of gelled products. Thus the off gas flow rate should be maintained so as to minimize residence time of the product in the reactor, thereby minimizing fouling. The conversion should be maintained within the range 55 to 75 percent, preferably 59 to 65 percent. We define conversion as the ratio of the production rate in pounds/hour to the sum of the production rate in pounds/hour plus the amount of unreacted ethylene in the off gas stream in pounds/hour, multiplied by one hundred. Unexpectedly, according to the present process, increasing the off gas rate results in an increase rather than a decrease in the overall production rate up to a maximum, which occurs at the optimum conversion for each specific initiator.

By ethylene polymer and copolymer telomer waxes we mean waxes having viscosities of 25 to 1,500 centipoises at 140°C., molecular weights of 1,000 to 5,000 and softening points (Ring and Ball) of 70° to 118°C. These products have very low viscosities such that melt index, a measurement generally applied to polyethylenes, is so high as to be impractical when applied to the present products.

The amount of initiator to be added will vary according to the production rate desired, but generally from $1.3 \times 10^{116\ 4}$ to $4 \times 10^{-4}$ mols of initiator per mol of ethylene will give optimum results.

The telogen acts both as a chain transfer agent and terminating agent. Suitable telogens are conventional and include compounds containing carbon, hydrogen, and oxygen free of olefinic unsaturation, which have boiling points below about 200°C. at atmospheric pressure, preferably below about 150°C. Preferred telogens contain up to four carbon atoms and up to two oxygen atoms. Illustrative of suitable telogens are alcohols such as methanol, ethanol, n-propanol, isopropanol, the butanols, cyclohexanol, diacetone alcohol and the like; ethers such as dimethyl ether, diethyl ether, diisopropyl ether and the like; ketones such as acetone, methyl ethyl ketone, isobutyl ketone, cyclohexanone and the like; esters such as methyl formate, propyl formate, ethyl acetate, methyl propionate, ethyl butylate, methyl malonate, triethyl orthoformate and the like; acids such as acetic acid, propionic acid or butyric acid and their corresponding anhydrides; compounds such as acetaldehyde, ethylene oxide, polyethylene oxide, dioxolane, dioxane, ethyl acetal, lactones, furanes, glycol diacetate and the like. Higher molecular weight aromatic hydrocarbon compounds can also be employed such as toluene, ethylbenzene, cumene, n-propylbenzene, amylbenzene, and the like. Isopropanol and acetone are especially preferred. The amount of telogen added can vary between about 10 to 60 percent, preferably about 12 to 28 percent, by weight of ethylene, but again, the concentration should remain substantially constant i.e., ± 1 percent, once equilibrium has been established within the reactor.

In addition to the preparation of polyethylene/telomer waxes, the present process can be applied equally to the preparation of copolymers of ethylene/telomer waxes. The preparation of such waxes is described in detail in copending application of Knutson and Dench, Ser. No. 580,196 filed Sept. 19, 1966, now U.S. Pat. No. 3,658,741. In addition to ethylene from about 0.5 to about 49 percent by weight of the ethylene of a comonomer which can be an unsaturated acid or an acyl halide, amide or ester derivative thereof, is also fed to the reactor. Suitable unsaturated acids can be monocarboxylic acids of three to six carbon atoms or dicarboxylic acids of four to eight carbon atoms, including for example acrylic acid, metharcylic acid, crotonic acid, maleic acid, fumaric acid, and the like. Illustrative of suitable acyl halides are acrylyl chloride, crotonyl chloride and the like; of suitable amides are acrylamide, methacrylamide, isopropylacrylamide and the like; of suitable esters are methyl acrylate, methyl methacrylate, ethyl acrylate, hydroxyethyl methacrylate, dimethylaminoethyl methacrylate and the like.

The reactants are fed to the reactor under suitable pressure. In the present process pressures of about 3,000 to 11,000 can be employed. Pressures of about 4,000 to 8,000 psi are preferred. Pressures of from 6,000 to 8,000 psi are preferred for the formation of hard waxes.

The temperature of the reactor must be carefully regulated. Suitable reaction temperatures include 140°-240°C. Reaction temperatures on the order of about 140°-170°C. are required for the preparation of hard waxes. If the temperature is too low, the production rate will be impractically low whereas if the temperature is too high, branching of the polymer chains will occur leading to softer products. The temperature of reaction will have some effect on the choice of initiator. As an illustration, since t-butylperacetate has a longer half life than t-butylperoctoate, t-butylperoctoate will be preferred for lower reaction temperatures of about 150°C. whereas t-butylperacetate will be preferred for reaction temperatures near 170°C.

The preferred procedure for preparing hard ethylene polymer/telomer waxes is conventional and is generally described in U.S. Pat. No. 2,683,141. An autoclave or tank-type reactor fitted with suitable agitation means and cooling means is brought to the desired temperature with steam. The pressure in the reactor is brought up to the desired operating pressure. The injection pumps are then started to deliver the required amounts of ethylene, telogen, initiator and comonomer if desired, to the upper part of the reactor and the off gas flow is started. After an initial induction period, the wax product is removed from the reactor along with the off gas, is collected in a receiving vessel and passed through a deoderizer to storage.

The invention will be further illustrated by the following examples, but it is to be understood that the invention is not meant to be limited to the details therein. In the examples, hardness is determined according to ASTM test D 1321-55T using an NBS certified D1321 needle.

In the Examples, ethylene of at least 99 percent purity and isopropanol of at least 99.8 percent purity as telogen were employed. The following procedure was used for the start up of each run: (a) the reactor was brought to operating temperature with steam; (b) the pressure was brought up to about 3,000 psi with ethylene, and an initial injection of isopropanol was pumped in; (c) the pressure was increased with ethylene to operating pressure; (d) high pressure injection pumps were started to deliver the required amounts of isopropanol and initiator dissolved in isopropanol; (e) the reactor let-down control valve for off gas flow was opened; (f) downstream equipment including scrubbers, off gas coolers and the like were put in operation; (g) after a brief induction period wax product started to form, the deoderizer was started and sampling begun on an hourly basis; (h) steady state conditions were achieved after 2-4 hours. Each run was continued for about 50-100 hours. When the run was terminated, the reactor was cooled and opened for inspection of fouling deposits.

EXAMPLE 1

Ethylene, isopropanol and an initiator were injected into a 4 liter cylindrical pressure reactor substantially as described in U.S. Pat. No. 2,683,141 except that the product was withdrawn as it was formed from the bottom of the reactor along with the off gas. The pressure in the reactor was maintained at 7,000 psi and the temperature at 150°C. during the reaction. The other reaction conditions are summarized below:

| Run No. | Catalyst | Ethylene Feed, lbs/hr. | Isopropanol % based on ethylene feed | Catalyst Feed, Mols/hr. | Production Rate, lb/hr. | Viscosity cps. 140°C. | Hardness 0.1 mm |
|---|---|---|---|---|---|---|---|
| 1. | t-butyl peroctoate | 2.90 | 18.0 | 0.0115 | 1.80 | 270 | 1.1 |
| 2. | t-butyl peracetate | 2.88 | 17.0 | 0.0104 | 1.88 | 490 | 1.0 |
| 3. | 1-cyano-1-(t-butylazo)cyclohexane | 3.16 | 17.0 | 0.0119 | 1.96 | 380 | 1.0 |
| 4. | 2-(t-butylazo)-isobutyronitrile | 1.92 | 14.1 | 0.0074 | 1.32 | 533 | 0.9 |

Continued

| Run No. | Catalyst | Ethylene Feed, lbs/hr. | Isopropanol % based on ethylene feed | Catalyst Feed, Mols/hr. | Production Rate, lb/hr. | Viscosity cps. 140°C. | Hardness 0.1 mm |
|---|---|---|---|---|---|---|---|
| 5. | 2-t-butylazo-2-phenylpropane | 1.74 | 15.2 | 0.0053 | 1.14 | 482 | 0.9 |

The above runs were continued for 3–5 days. Despite the very high production rates, very little reactor fouling was noted.

EXAMPLE 2

This example is given for purposes of comparing production rates versus hardness using initiators of the invention and conventional initiators including di-t-butylperoxide and hydrogen peroxide. These runs were made at 7,000 psi and 150°C. with the exception of runs 20–22 which were made at 170°C. Other reaction conditions are summarized below:

| Run No. | Catalyst | Ethylene Feed, lbs/hr. | Isopropanol, % based on ethylene feed | Catalyst Feed, mols/hr. | Conversion % | Production Rate, lbs/hr. | Viscosity cps. 140°C. | Hardness 0.1 mm |
|---|---|---|---|---|---|---|---|---|
| 1. | 1-cyano-1-(t-butylazo)cyclohexane | 2.68 | 16.7 | 0.0092 | 66.0 | 1.77 | 285 | 0.9 |
| 2. | do. | 2.80 | 16.2 | 0.0106 | 64.2 | 1.80 | 380 | 1.4 |
| 3. | do. | 3.16 | 17.0 | 0.0119 | 63.5 | 1.90 | 360 | 1.0 |
| 4. | do. | 3.22 | 16.5 | 0.0131 | 62.5 | 2.01 | 420 | 1.2 |
| 5. | t-butylperacetate | 2.55 | 18.0 | 0.0094 | 65.0 | 1.66 | 380 | 1.0 |
| 6. | do. | 2.88 | 17.0 | 0.0104 | 65.4 | 1.88 | 490 | 1.0 |
| 7. | do. | 3.90 | 17.0 | 0.0156 | 66.7 | 2.60 | 320 | 1.5 |
| 8. | t-butylperoctoate | 1.80 | 20.4 | 0.0062 | 61.0 | 1.10 | 350 | 1.0 |
| 9. | do. | 2.40 | 21.0 | 0.0082 | 62.0 | 1.49 | 350 | 0.9 |
| 10. | do. | 2.40 | 20–21 | 0.0103 | 62.5 | 1.50 | 300 | 1.0 |
| 11. | do. | 2.90 | 18.0 | 0.0115 | 62.0 | 1.80 | 270 | 1.1 |
| 12. | do. | 2.87 | 17.5 | 0.0123 | 60.0 | 1.77 | 400 | 1.0 |
| 13. | do. | 3.04 | 18.0 | 0.0139 | 56 | 1.70 | 350 | 1.3 |
| 14. | do. | 2.82 | 16.0 | 0.0142 | 62 | 1.75 | 370 | 1.0 |
| 15. | di-t-butylperoxide | 1.73 | 16.7 | 0.0046 | 65.3 | 1.13 | 474 | 1.1 |
| 16. | do. | 1.87 | 17.5 | 0.0054 | 67.9 | 1.27 | 362 | 1.5 |
| 17. | do. | 2.11 | 16.8 | 0.0108 | 71.5 | 1.51 | 937 | 2.5 |
| 18. | di-t-butylperoxide | 2.14 | 25.4 | 0.0119 | 71.9 | 1.54 | 382 | 4.7 |
| 19. | do. | 2.19 | 26.1 | 0.0135* | 72.6 | 1.59 | 360 | 4.5 |
| 20. | Hydrogen peroxide | 0.78 | 18.6 | 0.0067 | 23.0 | 0.18 | ** | 3.0 |
| 21. | do. | 1.31 | 17.0 | 0.0335 | 54.2 | 0.71 | 240 | 3.4 |
| 22. | do. | 1.52 | 17.0 | 0.0670 | 60.5 | 0.92 | 210 | 3.7 |

*severe reactor fouling
**not determinable

It is apparent that much higher production rates can be achieved with the present initiators with no loss of hardness in the product.

EXAMPLE 3

This example demonstrates that higher production rates of harder products are also obtained using the present initiators for ethylene copolymers. The following runs were carried out at 7,000 psi to prepare an ethylene-acrylic acid-isopropanol telomer wax containing 3.5 percent of acrylic acid. Runs 1 and 3 were carried out at 170°C. and run 2 at 150°C. Other operating conditions are summarized below:

| Run No. | Catalyst | Ethylene Feed, lbs/hr. | Isopropanol % based on ethylene feed | Catalyst Feed, mols/hr. | Production Rate, lbs/hr. | Hardness 0.1 mm |
|---|---|---|---|---|---|---|
| 1. | t-butylperacetate | 3.50 | 24.8 | 0.0094 | 2.10 | 2.1 |
| 2. | t-butylperoctoate | 2.97 | 24.9 | 0.0123 | 1.77 | 1.5 |
| 3. | di-t-butylperoxide | 2.41 | 24.0 | 0.0054 | 1.41 | 3.0 |

We claim:

1. In the process for preparing wax telomer polymers of ethylene having a molecular weight of 1,000 to 5,000 by vapor phase reaction of a feed stream containing ethylene, a telogen and a free radical initiator, the improvement which comprises utilizing as initiator a member of the group consisting of t-butylperacetate, t-butylperoctoate, 1-cyano-1(t-butylazo) cyclohexane, 2-(t-butylazo)isobutyronitrile and 2-t-butylazo-2-phenylpropane at conversions of between 55 to 75 percent.

2. A process according to claim 1 wherein the telogen is isopropanol.

3. A process according to claim 1 wherein the telogen is acetone.

4. A process according to claim 1 wherein the feed stream contains ethylene and from 0.5 to 49 percent, by weight of the ethylene, acrylic acid, and wherein the telogen is isopropanol.

5. A process according to claim 1 wherein the feed stream contains ethylene and from 0.5 to 49 percent, by weight of the ethylene, methacrylic acid, and wherein the telogen is isopropanol.

6. A process according to claim 1 wherein the feed stream contains ethylene and from 0.5 to 49 percent, by weight of the ethylene, methyl methacrylate, and wherein the telogen is isopropanol.

7. A process according to claim 1 wherein reaction is carried out at pressures of 3000 to 11,000 psi and temperatures from about 140° to 240°C.

8. A process according to claim 1 wherein from 10 to 60 percent by weight of ethylene of the telogen is charged to the reactor.

9. A process according to claim 1 wherein from $1.3 \times 10^{-4}$ to $4 \times 10^{-4}$ mols of initiator per mol of ethylene is charged to the reactor.

10. A process according to claim 1 wherein conversion is between 59 to 65 percent.

11. In the process for preparing wax telomer polymers of ethylene having a molecular weight of 1,000 to 5,000 by vapor phase reaction of a feed stream containing ethylene, a telogen and a free radical initiator, the improvement which comprises conducting the reaction under pressures of from 6,000 to 8,000 psi at temperatures of from about 140° to 170°C utilizing from $1.3 \times 10^{-4}$ to $4 \times 10^{-4}$ mols of an initiator selected from the group consisting of t-butylperacetate, t-butylperoctoate, 1-cyano-1(t-butylazo) cyclohexane, 2-(t-butylazo) isobutyronitrile, and 2-t-butylazo-2-phenylpropane at conversions between 59 and 65 percent.

12. A process according to claim 11 wherein from 12 to 28 percent by weight of ethylene of the telogen is charged to the reactor.

13. A process according to claim 11 wherein the initiator is t-butylperacetate.

14. A process according to claim 11 wherein the initiator is t-butylperoctoate.

15. A process according to claim 11 wherein the initiator is 1-cyano-1(t-butylazo)cyclohexane.

16. A process according to claim 11 wherein the initiator is 2-(t-butylazo)isobutyronitrile.

17. A process according to claim 11 wherein the initiator is 2-t-butylazo-2-phenylpropane.

18. In the process for preparing wax telomer polymers of ethylene having a molecular weight of 1,000 to 5,000 by vapor phase reaction of a feed stream containing ethylene, a telogen and a free radical initiator, the improvement which comprises utilizing as initiator a member of the group consisting of t-butylperacetate, t-butylperoctoate, 1-cyano-1(t-butylazo)cyclohexane, 2-(t-butylazo)isobutyronitrile and 2-t-butylazo-2-phenylpropane.

19. A process according to claim 18 wherein said telogen is an organic compound containing carbon, hydrogen, and oxygen, is free of olefinic unsaturation, and is characterized by having a boiling point below about 200°C. at atmospheric pressure.

* * * * *

UNITED STATES PATENT AND TRADEMARK OFFICE
CERTIFICATE OF CORRECTION

PATENT NO. : 3,888,911
DATED : June 10, 1975
INVENTOR(S) : John E. Dench and Harry Knutson It is certified that error appears in the above-identified patent and that said Letters Patent are hereby corrected as shown below:

Column 2, line 58 "$1.3 \times 10^{116\ 4}$" should be -- $1.3 \times 10^{-4}$ --.

Claim 10, line 2 "to" should be -- and --.

Signed and Sealed this seventh Day of October 1975

[SEAL]

Attest:

RUTH C. MASON
*Attesting Officer*

C. MARSHALL DANN
*Commissioner of Patents and Trademarks*